United States Patent [19]
Matsuoka et al.

[11] Patent Number: 5,643,997
[45] Date of Patent: Jul. 1, 1997

[54] POLYETHYLENIC RESIN COMPOSITION

[75] Inventors: Masami Matsuoka; Hikaru Aoyagi, both of Kawasaki, Japan

[73] Assignee: Showa Denko K.K., Tokyo, Japan

[21] Appl. No.: 474,958

[22] Filed: Jun. 7, 1995

Related U.S. Application Data

[63] Continuation of Ser. No. 842,374, Mar. 27, 1992, abandoned.

[30] Foreign Application Priority Data

Aug. 10, 1990  [JP]  Japan ................................. 2-262416

[51] Int. Cl.$^6$ ........................... C08L 23/04; C08L 23/26; C08L 51/06
[52] U.S. Cl. ................... 525/71; 525/74; 525/78
[58] Field of Search .................... 525/74, 71, 78

[56] References Cited

U.S. PATENT DOCUMENTS

| | | | |
|---|---|---|---|
| 4,087,587 | 5/1978 | Shida et al. | 525/74 |
| 4,487,885 | 12/1984 | Adur et al. | 525/74 |
| 4,684,576 | 8/1987 | Tabor et al. | 428/441 |
| 5,045,401 | 9/1991 | Tabor et al. | 428/516 |
| 5,126,199 | 6/1992 | Sawyer et al. | 525/74 |

FOREIGN PATENT DOCUMENTS

| | | |
|---|---|---|
| 0171777 | 2/1986 | European Pat. Off. . |
| 62-119248 | 5/1987 | Japan . |
| 2119389 | 11/1983 | United Kingdom . |

*Primary Examiner*—Ralph H. Dean
*Attorney, Agent, or Firm*—Antonelli, Terry, Stout & Kraus, LLP

[57] ABSTRACT

A polyethylenic resin composition comprising: at least one high density polyethylenic resin selected from (a) a high density polyethylenic resin (Resin A) and (b) a modified high density polyethylenic resin as derived by grafting on the Resin A a monomer of unsaturated carboxylic acid or its derivative (Resin B), at least one linear low density polyethylenic resin selected from (c) a linear low density polyethylenic resin (Resin C) and (d) a modified linear low density polyethylenic resin as derived by grafting on the Resin C the monomer as described in (b) above (Resin D), and (e) a linear very low density polyethylenic resin (Resin E) having a density (g/cm$^3$) of at least 0.890, but less than 0.910, and a melting point of 110° to 125° C. This polyethylenic resin composition is excellent in fuel oil resistance, low temperature impact resistance, and heat resistance, and provides a material having affinity or adhesive properties to various resinous and metallic materials.

2 Claims, No Drawings

POLYETHYLENIC RESIN COMPOSITION

This application is a Continuation application of application Ser. No. 842,374 filed Mar. 27, 1992, now abandoned.

TECHNICAL FIELD

The present invention relates to a specified polyethylenic resin composition. More particularly, it is concerned with a polyethylenic resin composition which is excellent in fuel oil resistance, impact resistance (particularly impact resistance at low temperature), heat resistance, and affinity or adhesive properties to metallic materials such as aluminum, iron and the like as well as various synthetic resin materials, such as various polyolefinic resins, e.g., a polyethylenic resin, a polypropylenic resin and the like, various polyamide resins, e.g., Nylon 6, Nylon 6—6 and the like, various hydroxy group-containing resins, e.g., a saponified product of an ethylene-vinyl acetate copolymer, various polyester resins, e.g., a polyethylene terephthalate resin, a polybutylene terephthalate resin and the like, and various halogen-containing resins, e.g., a polyvinyl chloride resin, a polyvinylidene chloride resin, and it is concerned with the polyethylenic resin composition which is useful particularly in a wrapping container field, and industrial material field and so forth in which various polyethylenic resin materials are used.

BACKGROUND ART

A technique of graft polymerizing unsaturated carboxylic acid or its derivatives (e.g., its anhydride) to an ethylenic homopolymer or ethylenic copolymers containing ethylene as a major component has already been known.

In particular, a modified polyethylenic resin in which acrylic acid or maleic acid or maleic anhydride is graft polymerized, has been put into practical use as an adhesive material for various laminates containing, as constitutional materials, polar resins such as a polyamide resin, a saponified product of an ethylene-vinyl acetate copolymer, a thermoplastic polyester resin, a polyvinyl chloride resin, a polyvinylidene chloride resin and the like, and metallic foils such as an aluminum foil and the like, and for coating of a metallic plate or a metallic pipe.

Moreover, it is widely used for purposes of imparting functions such as affinity, compatibility and so forth to a matrix resin in composite materials in which various additives such as a filler, a reinforcing agent, a pigment and the like are compounded, and to a matrix resin in polymer-blended materials in which different resins are blended.

Although a number of modified polyethylenic resin of this type have been proposed, it is difficult to satisfy all the various characteristics required in the market, using a single modified polyethylenic resin. Thus, in order to impart the characteristics, a number of proposals have been made; for example, the type of polyethylene in the modified polyethylenic resin is changed, and to the modified polyethylenic resin, various other specified polyolefinic resins, various elastomers, various polymers having a polar group or compounds having a polar group and the like are compounded.

For example, compositions in which an elastomer resin is compounded to a modified polyolefinic resin (e.g., Japanese Patent Publication No. 18251/1980, Japanese Patent Application Laid-Open Nos. 132345/1986 and 18258/1987, and Japanese Patent Publication No. 36217/1985), and compositions in which to a modified polyethylenic resin, other polymers (e.g., a saponified product of an ethylene-vinyl acetate copolymer, or a thermoplastic polyethylenic resin) are compounded (e.g., Japanese Patent Application Laid-Open Nos. 39381/1978, 124080/1977, 103480/1977) are proposed.

In addition, it has been proposed in recent years to impart the above characteristics or increase heat resistance and adhesive properties by using, as a base material of a modified polyethylenic resin and a compounding agent for the modified polyethylenic resin, a linear low density polyethylene resin having properties that environmental stress cracking resistance (ESCR), heat sealability, low temperature characteristics and the like are excellent (the linear low density polyethylene resin is hereinafter sometimes referred to as "L-LDPE" (Japanese Patent Application Laid-Open Nos. 170940/1982, 68351/1982, 276808/1986, 18258/1987, 25139/1987, 119247/1987).

Of these proposals, Japanese Patent Application Laid-Open No. 170940/1982 discloses a polyolefinic resin composition which comprises (a) 30 to 100 wt% of a moderate or low pressure processed copolymer of ethylene and 0.2 to 20 mol% of α-olefin, having a density of 0.900 to 0.940 g/cm$^3$, and (b) 70 to 0 wt% of other polyolefin resin, at least one of the components being graft polymerized. This is intended to provide a polyolefinic resin composition excellent/in adhesive properties and environmental stress cracking resistance (ESCR). However, as shown in Examples 1 to 6 and Table 1 thereof, the density of the moderate or low pressure processed polyethylene resin is 0.920 g/cm$^3$, and there is no concrete disclosure, as described hereinbelow, about the density range (0.890 to 0.910 g/cm$^3$) of the linear very low density polyethylene resin (which is hereinafter sometimes referred to as "L-VLDPE"). Moreover, the total amount of the graft modified L-LDPE and the unmodified L-LDPE in the composition described therein is 80 to 100 wt%, and the proportion of the resins in the total composition is markedly large. Furthermore, the composition fails to provide those products sufficiently satisfactory in fuel oil resistance, heat resistance and stiffness aimed at by the present invention.

In addition, in Japanese Patent Application Laid-Open No. 68351/1984 (Japanese Patent Publication No. 5614/1989), the same objects as above are intended to attain, and there is disclosed a laminate of a layer of a saponified product of an ethylene-vinyl acetate copolymer, a polyamide resin or a thermoplastic polyester resin, and a layer of a polyolefinic resin, wherein the laminate uses a polyethylenic resin composition comprising 99.9 to 65 wt% of an unmodified L-LDPE and 0.1 to 35 wt% of a graft modified L-LDPE or a high density polyethylene resin (which is hereinafter sometimes referred to as "HDPE"). As the unmodified L-LDPE and the graft modified L-LDPE, a linear polyethylene resin having a density of 0.910 to 0.960 g/cm$^3$ (preferably 0.915 to 0.930 g/cm$^3$; 0.926 g/cm$^3$ in the example) is used.

Japanese Patent Application Laid-Open Nos. 276808/1986 and 167308/1987 provide a process of production for obtaining a modified product of high graft efficiency by decreasing contamination of the graft modified product obtained and cross-linking or oxidation reaction occurring at the time of graft modification, by using particularly L-LDPE having a density of 0.900 to 0.940 g/cm$^3$ Japanese Patent Application Laid-Open No. 18258/1987 provides a graft modified polyolefinic resin using L-VLDPE having a density of less than 0.910 g/cm$^3$ as produced by a gas-phase low pressure method, a mixture of the above polyolefinic rein and different material, and the like. As this different material, an unmodified elastomer (e.g., an ethylene-propylene copolymer rubber), polyolefinic resins such as a high pressure processed low density polyethylenic resin, an ethylene-ethyl acrylate copolymer, an ethylene-vinyl acetate copolymer and the like, a polyamide resin, a saponified product of an ethylene-vinyl acetate copolymer, and the like are given.

In addition, Japanese Patent Application Laid-Open No. 25139/1987 provides a material excellent in moldability and adhesive properties, which is a composition comprising a high pressure processed low density polyethylenic resin as specified by a product of a melt flow rate (hereinafter sometimes referred to as "MFR") and a melt tension, and MFR, and a modified polyethylenic resin resulting from graft modification with acrylic acid or maleic anhydride of a copolymer (linear very low density polyethylenic resin) of ethylene and a-olefin, having a density of 0.880 to 0.900 g/cm$^3$.

In addition, in Japanese Patent application Laid-Open No 10107/1987, there are proposed a modified polyethylenic resin of a copolymer comprising ethylene and α-olefin having at least 4 carbon atoms having a density of 0.890 to 0.910 g/cm$^3$, a weight average molecular weight/number average molecular weight ratio of 2 to 15, and a product of melt tension and MFR at a temperature of 160° C. of not more than 4, and a composition of the above modified polyethylenic resin and an unmodified polyethylenic resin.

Furthermore in Japanese Patent Application laid-open Nos. 131345/1986 and 132377/1986, there are proposed an adhesive resin and its laminate, the adhesive resin being obtained by adding 1 to 40 parts by weight of rubber to 100 parts by weight of a copolymer of ethylene and α-olefin, having a density of 0.860 to 0.910 g/cm$^3$ a boiling n-hexane insoluble content of at least 10 wt%, and a maximum peak temperature as determined by a differential scanning colorimeter (DSC) of at least 100° C., or a composition of the above copolymer as a major component and a polyolefinic resin, and then by graft modifying the copolymer or the composition.

In addition, in Japanese Patent Publication No. 36942/1985, there is proposed a multi-layer laminate comprising a polyolefinic resin composition and a polyamide resin layer, the composition comprising 99 to 50 wt% of a polyethylenic resin having a degree of crystallization of at least 40% or a graft modified product of polypropylene having a boiling n-hexane insoluble content of at least 80%, and 1 to 50 wt% of an ethylene-α-olefin copolymer having a degree of crystallization of 5 to 30% and a density of 0.870 to 0.910 g/cm$^3$, which is a laminate markedly improved in interlaminar adhesive properties, particularly interlaminar adhesive properties at the time of being dipped in boiling water. As the most preferred ethylene-α-olefin copolymer, an ethylene-butene-1 random copolymer having a density of 0.870 to 0.900 g/cm$^3$, an ethylene copolymerization ratio of 85 to 95 mol% and a degree of crystallization of 5 to 30%, as polymerized by the use of a vanadium-based catalyst, is given.

However, even if any of the modified polyethylenic resins or compositions thereof is used, it is quite difficult to provide a material excellent in fuel oil resistance. (gasoline resistance) and impact resistance as aimed at by the present invention and further having good affinity and adhesive properties. For example, as the material for use in industrial Chemical can and containers of fuel, such as gasoline, which are used for a long time at low to high temperatures, and further as related car parts, it is required to sufficiently satisfy all the above various physical properties. Particularly, these physical properties are strongly required for an adhesive layer between a polyamide resin layer and a polyethylenic resin layer to be used in a multi-layer polyethylenic resin fuel container (e.g., five layers comprising three different materials) containing the polyamide resin layer, for example, provided for the purpose of preventing permeation of the fuel oil such as gasoline. Similarly, the aforementioned inventions that have been proposed so far fail to obtain sufficiently satisfactory material.

That is, even if an elastomer such as synthetic rubber is added to a graft modified polyethylenic resin or its composition in order to increase impact resistance, or an ethylene-α-olefin copolymer polymerized in the presence of a vanadium-based catalyst as a main catalyst or a graft modified polyethylenic resin made mainly of L-VLDPE and having a density of 0.890 to 0.910 g/cm$^3$ or its composition is used, the fuel oil resistance is seriously poor in use at high temperatures and for a long time. Moreover, with the graft modified HDPE alone or the composition of the graft modified HDPE and the unmodified HDPE or unmodified low density polyethylenic resin, for example, it is difficult to obtain greatly excellent impact resistance even if the fuel oil resistance is satisfied, and it is also difficult to obtain good affinity and adhesive properties to the aforementioned various resin materials and metallic materials.

To take as an example a molding of profile shape as produced by blow molding, several to several ten percent of burr is usually produced, and this burr is generally recycled for reuse from an economical standpoint. In the case of a multi-layer structure, in particular, produced for the purpose of preventing the permeation of contents to the outside of the container by using a barrier material of a polyamide resin (PA), a saponified product of an ethylene-vinyl acetate copolymer and the like, the barrier material is usually contained in the burr and recycled for reuse.

It is known that the impact resistance of the barrier material is markedly inferior to that of HDPE having a relatively high molecular weight as generally used in blow molding, and the barrier material has a disadvantage of being poor particularly in impact resistance at low temperatures. Therefore, in order to produce containers of multi-layer structure on a commercial scale and economically, the burr containing the material poor in impact resistance is recycled and used in the layer of the main material, the impact resistance of the container is decreased and it becomes difficult to satisfy the required performance.

Needless to say, in order to solve the above problem, there has been proposed a method in which a layer for recycling the burr is additionally provided in the multi-layer structure, or the burr is incorporated into the adhesive layer for bonding the main material (mainly a polyethylenic resin) and the barrier material for the purpose of recycling thereof. However, the former method is not economical in that it needs an additional apparatus for producing the multi-layer structure, and the latter method is not desirable in that the barrier material (e.g., PA) in the burr reacts with the graft group of the graft modified polyolefinic resin, thereby causing gelation, and long term adhesive durability is poor.

For the above reasons, as disclosed in, for example, Japanese Patent Publication No. 34461/1985 (Japanese Patent Application Laid-Open No. 113678/1979) and Japanese Patent Publication No. 42625/1986 (Japanese Patent Application Laid-Open No. 91634/1980), it has been proposed to use a specified polyolefinic resin or polyamide resin excellent in adhesive properties for the purpose of preventing a decrease in the impact resistance of the resulting product. In these inventions, however, the respective resins are poor in fuel oil resistance over a long period of time and unsuitable for practical use.

Under these circumstances, the present invention is intended to overcome all the above problems, and the object of the present invention is to provide a polyethylenic resin composition which is not only good in fuel oil resistance in an atmosphere of high temperature but also markedly excellent in impact resistance (particularly at low temperature), and furthermore which, when the burr produced at the time of molding is recycled and used in admixture with the multi-layer constituting material, is excellent in the affinity to the material to be mixed therewith, and adhesive properties to the barrier material.

DISCLOSURE OF INVENTION

The present invention provides a polyethylenic resin composition comprising:
at least one high density polyethylenic resin selected from:
  (a) a high density polyethylenic resin (Resin A) having a density (g/cm$^3$) of at least 0.935 and a melt flow rate (MFR) (g/10 min.) (measured according to JIS-K7210, Condition 4) of at least 0.01, and
  (b) a modified high density polyethylenic resin (Resin B) as derived by grafting on the resin A at least one monomer selected from the group consisting of unsaturated carboxylic acids and derivatives thereof,
at least one linear low density polyethylenic resin selected from:
  (c) a linear low density polyethylenic resin (Resin C) having (number of branches in the short chain: 5 to 30)/ (number of carbon atoms in the main chain: 1.000), a density (g/cm$^3$) of from 0.910 to less than 0.935, a melt flow rate (g/10 min.) of 0.1 to 50, and a melting point as determined by the differential scanning calorimetric method of 115 to 130° C., and
  (d) a modified linear low density polyethylenic resin (Resin D) as derived by grafting on the resin C the monomer described in (b) above, and
  (e) a linear very low density polyethylenic resin (Resin E) having (number of branches in the short chain: 18 to 60)/(number of carbon atoms in the main chain: 1,000), a density (g/cm$^3$) of from 0.890 to less than 0.910, a melt flow rate (g/10 min.) of 0.1 to 30, and a melting point as determined by the differential scanning calorimetric method of 110° to 125° C.,
wherein Resin B/(Resin A+Resin B) and/or Resin D/(Resin C+Resin D) are each at least 0.1 wt%, (Resin A+Resin B)/(Resin A+Resin B+Resin C+Resin D) is from 10 to 97.5 wt%, the proportion of Resin E in the total composition is from 5.0 to 40 wt%, and the total amount of the grafted monomers in the total composition is from 0.001 to 5.0 wt%.

BEST MODE FOR CARRYING OUT THE INVENTION

The present invention will hereinafter be explained in detail.
(1) HDPE

HDPE (Resin A) and HDPE for preparation of modified HDPE (Resin B) which are used in the present invention, are all obtained by homopolymerizing ethylene alone or copolymerizing ethylene and α-olefin having a number of carbon atoms of 3 to 12 (preferably 3 to 8) in the presence of a so-called Philips catalyst or Ziegler catalyst, and generally they are produced under a pressure of atmospheric pressure to about 100 kg/cm$^2$ (moderate to low pressure polymerization). Preferred examples of the α-olefin are propylene, butene-1, hexene-1, 4-methylpentene-1 and octene-1. The copolymerization ratio is 6.5 wt% at most, and particularly preferably not more than 6.0 wt%.

The number of branched short chains per 1,000 carbon atoms of the main chain in the HDPE is at most 20.

The density is at least 0.935 g/cm$^3$, preferably at least 0.937 g/cm$^3$ and particularly preferably at least 0.940 g/cm$^3$. If a polyethylenic resin having a density of less than 0.935 g/cm$^3$ is used, the resulting composition provides molded products which are inferior in stiffness, heat resistance, fuel oil resistance, surface hardness and so forth.

MFR is at least 0.01 g/10 min., preferably at least 0.015 g/10 min., and particularly preferably at least 0.02 g/10 min. If MFR is less than 0.01 g/10 min., moldability is poor. Although the upper limit is not intended to specify, it is usually not more than 50 g/10 min. and particularly preferably not more than 35 g/10 min.

Particularly in the modified HDPE as described hereinafter, if MFR is less than 0.01 g/10 min., MFR of the grafted HDPE obtained is generally much lower than MFR of HDPE used for graft modification, although it varies depending on conditions of graft modification, which will lead to a reduction of moldability, and at the same time, compatibility in preparation of a mixture of the modified HDPE and the non-grafted HDPE, is seriously decreased, so that no uniform composition can be obtained. In general, therefore, MFR of the modified polyethylenic resin is preferably at least 0.05 g/10 min. and particularly preferably at least 0.1 g/10 min.

These HDPEs may be used singly or in combination with each other.
(2) L-LDPE

For L-LDPE (Resin C) and L-LDPE for preparation of the modified L-LDPE (Resin D) which are used in the present invention, the density is from 0.910 /cm$^3$ to less than 0.935 g/cm$^3$, preferably at least 0.912 g/cm$^3$, and particularly preferably from 0.915 g/cm$^3$ to less than 0.935 g/cm$^3$. Moreover, the number of branched short chains per 1,000. carbon atoms of the main chain is from 5 to 30, with the range of from 5 to 25 being particularly suitable. In any of the cases that the density is less than the above lower limit or in excess of the upper limit, and the number of branched side chains per 1,000 carbon atoms of the main chain is less than the lower limit or in excess of the upper limit, the composition of the present invention is not sufficiently high in uniformness, which is undesirable. That is, if there is used L-LDPE not falling within the above specified scope, a decrease in tensile elongation is particularly large in evaluation of long term fuel oil resistance, and moreover, under conditions that heat resistance is considered (more specifically a durability test in an atmosphere of at least 100° C.), physical properties are more decreased; they are considered al due to ununiformity in dispersibility of the components of the composition.

From a viewpoint of moldability, MFR is from 0.1 to 50 g/10 min., preferably from 0.2 to 40 g/10 min. and particularly preferably from 0.2 to 30 g/10 min. The melting point as determined by the DSC method (the measuring method will hereinafter be explained) is from 115° to 130° C. and preferably from 118° to 130° C., with the range of from 118° to 125° C. being particularly suitable. If the melting point is less than 115° C., long term fuel oil resistance at high temperatures is not good. On the other hand, if it is more than 130° C., impact resistance is poor.

This L-LDPE is produced industrially, and its process of production is well known. Since the L-LDPE is excellent particularly in environmental stress cracking resistance, transparency, heat sealability, low temperature characteristics and so forth, it is utilized in a wide variety of fields (for example, wrapping material such as film, and industrial material such as pipe). The L-LDPE is produced by copolymerizing ethylene and the aforementioned α-olefin in the presence of a so-called Ziegler catalyst according to any of the gas phase method, the solution method and the slurry (suspension) method.

The above short chain substantially comprises an alkyl group having 1 to 10 carbon atoms (preferably 1 to 6 carbon atoms).

(3) L-VLDPE

A process of production of L-VLDPE (Resin E) to be used in the present invention is well known, and the L-VLDPE has been produced industrially by the improved slurry polymerization method or the gas phase polymerization method, for example, and widely utilized in recent years.

The polymer thus obtained is different from an ethylene-α-olefin random copolymer (density 0.86 to 0.91 g/cm$^3$) having a low degree of crystallization of from several percent to about 30% as obtained by polymerizing by the use of a vanadium catalyst system; the polymer is L-VLDPE produced in the presence of a stereoregular catalyst (so-called Ziegler catalyst) by the slurry method or the gas phase method, as described in, for example, Japanese Patent Application Laid-Open Nos. 68306/1982, 23011/1984 and 109805/1987.

The L-VLDPE as used in the present invention is L-VLDPE having a density of from 0.890 g/cm$^3$ to less than 0.910 g/cm$^3$, an MFR of from 0.1 to 30 g/10 min., a melting point as determined by DSC of from 110° to 125° C., and a number of branched short chains of 18 to 60 per 1,000 carbon atoms of the main chain.

In the present invention, if the density of the above polyethylenic resin is less than 0.890 g/cm$^3$ the composition obtained is poor in fuel oil resistance. On the other hand, if the density is more than 0.910 g/cm$^3$ the composition obtained is not sufficiently high in impact resistance. For these reasons the density is preferably in the range of from 0.892 to 0.910 g/cm$^3$.

If MFR of the resin is less than 0.1 g/10 min., moldability and workability are not satisfactory and if it is more than 30 g/10 min. it has a problem in impact resistance. For these reasons MFR is preferably in the range of from 0.1 to 10 g/10 min., with the range of from 0.2 to 8.0 g/10 min. being particularly suitable.

Moreover the melting point as determined by DSC (about 5 mg of a sample is weighed, placed on a DSC unit, raised from room temperature to 200° C. at a temperature-raising rate of 10° C./10 min., maintained at that temperature for 5 minutes, lowered to room temperature at a temperature-lowering rate of 10° C./min., and the temperature of the peak of the maximum endothermic region when the temperature is raised at the above temperature-raising rate, is determined as the melting point) is from 110° to 125° C. Particularly preferably the melting point is in the range of from 112° to 125° C. If the melting point is less than 110° C., the resulting composition is not enough in heat resistance. On the other hand, if it is more than 125° C., the effect of improving impact resistance is poor.

The number of branched short chains per 1,000 carbon atoms of the main chain in L-VLDPE is from 18 to 60, preferably from 18 to 50 and particularly preferably from 20 to 50. If the number of branched short chains per 1,000 carbon atoms of the main chain is less than 18, a problem arises in respect of the impact resistance obtained. On the other hand, if it is more than 60, fuel oil resistance is seriously decreased. The short chain substantially comprises an alkyl group having from 1 to 10 carbon atoms (preferably from 1 to 6 carbon atoms).

In addition, from a viewpoint of the effect of improving impact resistance, the initial modulus in tension of the polyethylenic resin is preferably not more than 2×10$^3$ kgf/cm$^2$ (preferably not more than 1.5×10$^3$ kgf/cm$^2$).

(4) Modified HDPE and modified L-LDPE

Modified HDPE and modified L-LDPE which are used in the present invention, can be obtained by treating the above HDPE and L-LDPE with unsaturated carboxylic acid and/or its derivative as described hereinafter in the presence of a radical initiator. In this case, a synthetic resin and an elastomer (rubber) as described hereinafter, which have an affinity with the HDPE and L-LDPE to be grafted, may be allowed to coexist.

(4-1) Unsaturated carboxylic acid and its derivatives

As the unsaturated carboxylic acid and its derivatives for production of the modified HDPE and the modified L-LDPE (graft treatment), monobasic unsaturated carboxylic acids, dibasic unsaturated carboxylic acids, and their metal salts, amides, imides, esters and acid anhydrides can be given. The number of carbon atoms of the monobasic unsaturated carboxylic acid among the above compounds is generally at most 20 (preferably not more than 15). The number of carbon atoms of the derivative is usually at most 20 (preferably not more than 15). The number of carbon atoms of the dibasic unsaturated carboxylic acid is generally at most 30 (preferably not more than 25). The number of carbon atoms of the derivative is usually at most 30 (preferably not more than 25).

These unsaturated carboxylic acids and typical examples thereof are described in Japanese Patent Application Laid-Open No. 10107/1987, page 3, lower and right column, line 8 to page 4, upper and right column, line 12.

Of these unsaturated carboxylic acids and derivatives thereof, acrylic acid, methacrylic acid, maleic acid and its anhydride, 5-norbornene-2,3-dicarboxylic acid and its anhydride, and glycidyl methacrylate are preferred, with maleic anhydride and 5-norbornic anhydride being particularly suitable.

(4-2) Radical Initiator

Moreover, with regard to the radical initiator for graft treatment in the composition of the present invention, the decomposition temperature at the half life of one minute and a half is usually at least 100° C., preferably at least 103° C. and particularly preferably at least 105° C. Suitable radical initiators include organic peroxides such as dicumyl peroxide; benzoyl peroxide; di-tert-butyl peroxide; 2,5-dimethyl-2,5-di(tert-butylperoxy)hexane; 2,5-dimethyl-2,5-di(tert-butylperoxy)hexane-3; lauroyl peroxide; and tert-butylperoxy benzoate.

(4-3) Synthetic Resin and Elastomer

The synthetic resin and elastomer to be used in combination with the HDPE and L-LDPE to be grafted, in the production of the modified HDPE and modified L-LDPE for use in the composition of the present invention, are the ones having affinity with HDPE or L-LDPE.

Examples of the synthetic resin include a high pressure processed low density polyethylenic resin, and copolymers of ethylene and other vinyl monomers, such as an ethylene-vinyl acetate copolymer, an ethylene-acrylic acid copolymer, an ethylene-methacrylic acid copolymer, an ethylene-methyl acrylate copolymer, an ethylene-ethyl acrylate copolymer, an ethylene-butyl acrylate copolymer, and an ethylene-methyl methacrylate copolymer.

Examples of the elastomer includes synthetic and natural rubbers, for example, ethylene-α-olefin copolymer rubber such as ethylene-propylene copolymer rubber, ethylene-propylene-diene terpolymer rubber, and ethylene-butene-1 copolymer rubber, polyisobutylene rubber, polyurethane rubber, styrene-butadiene copolymer rubber, and polybutadiene rubber.

(4-4) Proportion

In production of the modified HDPE and the modified L-LDPE to be used in the present invention, the amounts of the unsaturated carboxylic acid and/or its derivative, and the radical initiator used per 100 parts by weight of each polyethylenic resin to be grafted are as follows.

The total amount of the unsaturated carboxylic acid and/or its derivative used is generally from 0.01 to 5.0 parts by weight, preferably from 0.01 to 3.0 parts by weight, and particularly preferably from 0.02 to 2.0 parts by weight. If the proportion of the unsaturated carboxylic acid and/or its derivative is such that the total amount thereof is less than 0.01 part by weight, graft modification is achieved only insufficiently, so that a problem arises with respect to the affinity or adhesive properties aimed at by the present invention. On the other hand, if it is more than 5.0 parts by weight, gelation, coloration, deterioration and so forth of the modified HDPE and modified L-LDPE obtained may be caused, and no increase in the performance aimed at by the present invention is obtained.

The amount of the radical initiator used is usually from 0.001 to 1.0 part by weight, preferably from 0.005 to 1.0 part by weight and particularly preferably from 0.005 to 0.5 part by weight. If the amount of the radical initiator used is less than 0.001 part by weight, the effect of graft modification is exhibited only insufficiently, as a result of which a long period of time is required for completely carrying out the graft modification and moreover, unreacted materials remain in admixture. On the other hand, if it is more than 1 part by weight, excessive decomposition or a cross-linking reaction undesirably occurs.

When the above synthetic resin or elastomer is used, the proportion of the synthetic resin or elastomer in the total amount of the synthetic resin or elastomer and the HDPE or L- LDPE is generally at most 15 wt%, and particularly preferably not more than 10 wt%. If the proportion of the total of the synthetic resin and/or elastomer in the total amount of the synthetic resin and/or elastomer and the HDPE or L-LDPE is more than 15 wt%, the basic characteristics of the HDPE and L-LDPE are sometimes deteriorated.

(4-5) Production of Modified HDPE and/or Modified L-LDPE

The modified HDPE and modified L-LDPE as used herein can be produced by treating the respective HDPE and L-LDPE (in some cases, containing the synthetic resin and/or elastomer), the unsaturated carboxylic acid and/or its derivative, and the radical initiator in the aforementioned ranges.

In this case, the modified polyethylenic resin may be produced by preparing a mixture containing a predetermined proportion of HDPE or L-LDPE so as to be in the proportion described in (4-6) mentioned under, compounding the aforementioned radical initiator and graft monomer to the mixture, and processing them by the method as described hereinafter. From a viewpoint of homogeneity of the components of the adhesive composition, and further from an economic standpoint, the above method is preferably employed.

As the processing method, known methods as described in Japanese Patent Application Laid-Open Nos. 10107/1987 and 132345/1986, etc., can be employed.

As the processing method, a method of kneading the HDPE and L-LDPE, and the like in a molten state by the use of e.g., an extruder, a Vanbury mixer or a kneader, a solution method in which polymers such as HDPE and L-LDPE are dissolved in a suitable solvent, a slurry method in which polymer particles such as HDPE and L-LDPE are suspended, and a so-called gas phase graft method can be given.

The processing temperature is determined appropriately taking into consideration the deterioration of polymers such as HDPE and L-LDPE, decomposition of unsaturated carboxylic acid and its derivative, the decomposition temperature of the radical initiator used, and so forth. When the above method of kneading in a molten state is taken as an example, the processing temperature is usually from 100° to 350° C., preferably from 150° to 300° C. and particularly preferably from 180° to 300° C.

Although, of course, the modified HDPE and the modified L-LDPE as used herein are produced in the manner as described above, for the purpose of increasing the performance, there can be employed known methods as described in Japanese Patent Application Laid-Open No. 10107/1987, for example, a method in which at the time of the graft modification or after the graft modification, an epoxy compound or a polyfunctional compound containing groups such as an amino group or hydroxyl group is reacted, and a method in which unreacted monomers (unsaturated carboxylic acid and its derivative) and by-produced components, etc. are removed by heating or washing, for example.

(4-6) Formulation

The proportion of the above L-VLDPE (Resin E) in the polyethylenic resin composition of the present invention is from 5.0 to 40 wt%, preferably from 5.0 to 37.5 wt% and particularly preferably from 7.0 to 37.5 wt%. If the proportion of L-VLDPE in the polyethylenic resin composition is less than 5.0 wt%, the composition obtained is poor in impact resistance. On the other hand, if it is more than 40 wt%, fuel oil resistance (particularly fuel oil resistance at 40° C.) is markedly decreased.

It is necessary for the polyethylenic resin composition of the present invention to contain at least one of the modified HDPE and the modified L-LDPE.

When only the modified HDPE of the modified HDPE and the modified L-LDPE is contained, the proportion of the modified HDPE in the total amount of the above HDPE and the modified HDPE ((Resin B)/(Resin A+Resin B)) is at least 0.1 wt%, preferably at least 1.0 wt% and particularly preferably at least 2.5 wt%. If the proportion of the modified HDPE in the total amount of the HDPE and the modified HDPE is less than 0.1 wt%, there cannot be obtained a polyethylenic resin composition satisfactory in affinity or adhesive properties to the aforementioned resin material or metal material, for example, as aimed at by the present invention.

Although the proportion of the L-LDPE in the total amount of the HDPE, the modified HDPE and the L-LDPE ((Resin C)/(Resin A+Resin B+Resin C)) is not critical, it is usually from 2.5 to 75 wt%, preferably from 5.0 to 75 wt%, and particularly preferably from 5.0 to 60 wt%. If the proportion is less than 2.5 wt%, the composition is poor in homogeneity, and if it is more than 75 wt%, heat resistance and long term fuel oil resistance at high temperatures are decreased.

When only the modified L-LDPE of the modified HDPE and the modified L-LDPE is contained, the proportion of the modified L-LDPE in the total amount of the L-LDPE and the modified L-LDPE ((Resin D)/(Resin C+Resin D)) is similarly at least 0.1 wt%, preferably at least 0.5 wt% and particularly preferably at least 1.0 wt%.

Although the proportion of HDPE in the total amount of HDPE, L-LDPE and the modified L-LDPE ((Resin A)/(Resin A+Resin C+Resin D)) is not critical, it is preferably from 5 to 75 wt%. If the proportion is less than 5 wt%, fuel oil resistance is not sufficiently satisfactory, and if it is more than 75 wt%, adhesive durability at high temperatures is not sufficiently satisfactory.

When both the modified HDPE and modified L-LDPE are contained, the respective proportions of the modified HDPE and modified L-LDPE are the same as described above.

The sum of HDPE and the modified HDPE in the total amount of HDPE, the modified HDPE, L-LDPE and the modified L-LDPE ((Resin A+Resin B)/(Resin A+Resin B+Resin C+Resin D)) is from 10 to 97.5wt%. If it is less than 10 wt%, fuel oil resistance is not sufficiently satisfactory, and if it is more than 97.5wt%, adhesive durability at high temperatures is not sufficiently satisfactory.

(5) Composition and Process for Preparation thereof

The polyethylenic resin composition of the present invention comprises HDPE, modified HDPE, L-LDPE, modified L-LDPE and L-VLDPE in the above specified ranges.

In general, when a polymer (HDPE and L-LDPE in the case of the present invention) is graft-modified with a monomer (unsaturated carboxylic acid or its derivative in the case of the present invention), the monomer is not always grafted onto all the polymers; part of the polymers remain ungrafted. In the present invention, such ungrafted HDPE and L-LDPE may be used as such without the separation thereof. Moreover, HDPE and L-LDPE not subjected to the graft treatment may be compounded.

HDPE, L-LDPE and L-VLDPE may be mixed in advance and then mixed with the modified HDPE and modified L-LDPE, or all the components of the composition may be mixed at the same time. Moreover, HDPE and L-LDPE for modification may be previously blended in a desired ratio and then grafted, to which HDPE, L-LDPE and L-VLDPE are further added, if necessary.

In all of the above cases, the proportion of the grafted monomer as the total amount thereof in the resin composition of the present invention is from 0.001 to 5.0 wt%, preferably from 0.01 to 2.0 wt%, and particularly preferably from 0.02 to 1.0 wt%. If the proportion of the grafted monomer as the total amount thereof in the resin composition is less than 0.001 wt%, the various effects of the present invention cannot be exhibited sufficiently. On the other hand, if it is more than 5.0 wt%, it is not possible to further increase the effects of the present invention.

In preparing the polyethylenic resin composition of the present invention, additives commonly used in the field of polyolefinic resins, such as an antioxidant, a heat stabilizer, a ultraviolet ray absorber, a lubricant, an antistatic agent and a pigment (adhesive), can be compounded within the range that does not substantially deteriorate the effects of the composition.

As the mixing method for preparation of the composition, all of various mixing methods generally employed in the field of synthetic resins, that is, a method of dry blending by the use of a mixer such as a tumbler or a Henschel mixer, and a method of melt kneading by the use of a kneader such as an extruder, a kneader, a Banbury mixer or a roll, can be employed. By employing two or more of the mixing methods, a more uniform composition can be obtained (for example, a method in which dry blending is previously carried out and the mixture thus obtained is further melt kneaded).

(6) Processing Method, etc.

The resin composition of the present invention as obtained above can be used in production of containers such as industrial chemical cans and tanks of fuel oil, e.g., gasoline. The composition can be easily molded into the desired shape by the blow molding method which is generally employed as a molding method, and there can be obtained moldings having excellent impact resistance which has not been obtained. In addition to the blow molding method, various parts such as caps and other industrial parts can be easily obtained by the injection molding method, the compression molding method and so forth.

In recent years, a polyethylenic resin has been used in production of fuel tanks of cars. Since the polyethylenic resin composition of the present invention has excellent impact resistance (particularly impact resistance at low temperatures) and fuel oil resistance at the same time, it is particularly useful as an adhesive layer between a barrier material and a main material (mainly HDPE) of a multi-layer fuel oil tank with a polyamide resin (PA) as a barrier layer as being developed as one of techniques to prevent permeation of the fuel oil from the tank. Assuming that the main material is indicated by Ma, the barrier material is indicated by Ba, and the composition of the present invention is indicated by Co, the multi-layer structure includes three or more layer structures of Ma/Co/Ba, Ma/Co/Ba/Co/Ma, Ma/Co/Ba/Co, Co/Ba/Co/Ma and like (of course, in these structures, a layer made by reutilizing burr formed in blow molding, for example, may be provided between the Ma and Co layers).

Moreover, since the polyethylenic resin composition of the present invention has affinity and adhesive properties to a barrier resin, such as PA, it can be used as a laminate comprising two layers of two different materials or three layers of two different materials, such as Co/Ba or Co/Ba/Co.

Hereinafter the present invention is described in greater detail.

Performance tests in the examples and comparative examples were carried out by the following methods.

(a) Impact Resistance

According to JIS-K7110, a notched Izod impact strength at a temperature of 23° C. and −40° C. (at −35° C. in Examples 13 to 34 and Comparative Examples 8 to 21) was measured, using a 3 mm thick press plate.

(b) Heat Resistance and Fuel Oil Resistance (Durability Test)

A JIS No. 2 test piece obtained from a 2 mm thick press plate was allowed to stand for 96 hours in a gear oven maintained at 115° C., and then dipped for 2,000 hours in a regular gasoline on the market as maintained at 40° C. (provided that it was allowed to stand for 120 hours at 110° C. in the gear oven in Examples 13 to 24 and Comparative Examples 8 to 14, and in Examples 23 to 34 and Comparative Examples 15 to 21, it was allowed to stand for 96 hours at 100° C. in the oven and then dipped for 1,500 hours in the gasoline at 40° C.). Thereafter, the tensile elongation at break ($E_1$) was measured according to JIS K7113, which was compared with the tensile elongation at break ($E_O$) of the test piece not subjected to the above durability test, thereby evaluating the heat resistance and fuel oil resistance.

(c) Adhesive Strength to PA6 (kg/cm)

By the use of a multi-layer coextrusion apparatus provided with two extruders, one of the extruders being for use in production of the inner and outer layers and having a diameter of 40 mm, and the other being for use in production of the intermediate layer and having a diameter of 30 mm, and also with a multi-layer T-die for production of three layers made of two different materials, two different material-three layer structure sheets with a 0.10 mm thick intermediate layer of Nylon 6 (trade name: Amilane CM1061, produced by Toray Co., Ltd.) (provided that in Examples 13 to 34 and Comparative Examples 8 to 21, CM1041 (produced by Toray Co., Ltd.) was used), and inner and outer layers each having a thickness of 0.20 mm and being made of the polyethylenic resin composition prepared in the example or comparative example, were produced at a molding temperature of 230° C. A test piece (width 10 mm, length 150 mm) of each of the sheets obtained was measured for adhesive strength (kg/cm width) prior to the processing by carrying out T-type peeling at the interface of Nylon 6 by the use of Tensilon tensile tester at a peeling rate of 50 mm/min. For evaluation of heat resistance and fuel oil resistance with regard to adhesive properties, each multi-layer test piece was allowed to stand for 96 hours in an oven maintained at 110° C., then dipped for 2,000 hours in a regular gasoline on the market as maintained at 40° C. and, thereafter, the adhesive strength to Nylon 6 was determined as a value after the processing in the same manner as above.

Examples 1 to 10 and Comparative Examples 1 to 6

Modified polyethylenic resins used in Examples 1 to 10 and Comparative Examples 1 to 6 were produced as described in (i) to (iv) and (viii) below. Characteristics of unmodified polyethylenic resins are shown in (i) to (vii).

Compositions comprising these various polyethylenes were prepared in the form of pellet by melt kneading at a temperature of 215° C. a mixture previously dry blended in the formulation shown in Table 1, by the use of a 40 φ extruder provided with a Dulmage-type screw. The compositions thus obtained were measured for Izod impact strength, heat resistance and fuel oil resistance, and adhesive strength to PA6. The results are shown in Table 1.

(i) Modified HDPE (indicated by g.P$_1$)

To HDPE (indicated by P$_1$) powder having a density of 0.951 g/cm$^3$ and MFR of 0.73 g/10 min., was added 0.012 phr of 2,5-dimethyl-2,5-tert-butylperoxyhexane, which were then dry blended for 2 minutes by the use of a Henschel mixer. After addition of 0.375 phr of maleic anhydride, the resulting mixture was further dry blended for 2 minutes by the use of the Henschel mixer, and then melt kneaded at a resin temperature of 258° C. and pelletized.

The amount of maleic anhydride grafted was measured by the infrared absorption spectral method and found to be 0.33 wt%.

(ii) Modified HDPE (indicated by g.P$_2$)

Modified HDPE in which the amount of maleic anhydride grafted was 0.32 wt%, was produced in the same manner as in (i) above except that HDPE (indicated by P$_2$) having a density of 0.944 g/cm$^3$ and MFR of 0.38 g/10 min. was used.

(iii) Modified L-LDPE (indicated by g.Q$_1$)

Modified L-LDPE in which the amount of maleic anhydride grafted was 0.30 wt%, was produced in the same manner as in (i) above except that L-LDPE (indicated by Q$_1$) having a density of 0.927 g/cm$^3$, MFR of 0.85 g/10 min., Tm of 120.5° C. and a number of branches of 11/1,000 carbon atoms of the main chain was used.

(iv) Modified L-LDPE (indicated by g.Q$_2$)

Modified L-LDPE in which the amount of maleic anhydride grafted was 0.30 wt%, was produced in the same manner as in (i) above except that L-LDPE (indicated by Q$_2$) having a density of 0.916 g/cm$^3$, MFR of 2.0 g/10 min., Tm of 119.5° C. and a number of branches of 20/1,000 carbon atoms of the main chain was used.

(v) L-VLDPE (indicated by R$_1$)

This was L-VLDPE having a density of 0.904 g/cm$^3$, MFR of 0.98 g/10 min., Tm of 119.5° C., and a number of branches of 28/1,000 carbon atoms of the main chain.

(vi) L-VLDPE (indicated by R$_2$)

This was L-VLDPE having a density of 0.898 g/cm$^3$, MFR of 2.7 g/10 min., Tm of 116° C. and number of branches of 40/1,000 carbon atoms of the main chain.

(vii) L-VLDPE (indicated by R$_3$)

This was different from the one above and obtained by the use of the conventional vanadium catalyst system, and was L-VLDPE having a density of 0.900 g/cm$^3$, MFR of 2.1 g/10 min., Tm of 101° C. and a number of branches of 73/1,000 carbon atoms of the main chain.

(viii) Modified L-VLDPE (indicated by g.R$_3$)

This was obtained in the same manner as in (i) above except that R$_3$ was used as the polyethylene, and the amount of maleic anhydride grafted was 0.29 wt%.

TABLE 1

| Run No. | Resins of Composition and Formulation (wt %) | | | | | | | | | | | Izod Impact Strength (kg · cm/cm) | |
|---|---|---|---|---|---|---|---|---|---|---|---|---|---|
| | Modified HDPE | | HDPE | | Modified L-LDPE | | L-LDPE | | L-VLDPE | | Modified L-VLDPE | | 23° C. | −40° C. |
| Example 1 | g · P$_1$ | 40 | — | | g · Q$_1$ | 45 | — | | R$_1$ | 15 | — | | 85 | 68 |
| Example 2 | g · P$_1$ | 45 | — | | g · Q$_1$ | 30 | — | | R$_1$ | 25 | — | | 96 | 79 |
| Example 3 | g · P$_1$ | 25 | P$_1$ | 25 | g · Q$_1$ | 15 | — | | R$_1$ | 35 | — | | 83 | 70 |
| Example 4 | g · P$_1$ | 40 | — | | g · Q$_1$ | 5 | Q$_1$ | 30 | R$_1$ | 25 | — | | 100 | 81 |
| Example 5 | g · P$_1$ | 20 | P$_1$ | 20 | g · Q$_1$ | 10 | Q$_1$ | 40 | R$_1$ | 10 | — | | 82 | 65 |
| Example 6 | g · P$_1$ | 20 | P$_1$ | 20 | g · Q$_1$ | 10 | Q$_1$ | 30 | R$_1$ | 20 | — | | 91 | 74 |
| Example 7 | g · P$_1$ | 20 | P$_1$ | 20 | g · Q$_1$ | 10 | Q$_1$ | 20 | R$_1$ | 30 | — | | 95 | *0 |
| Example 8 | g · P$_2$ | 40 | P$_2$ | 15 | g · Q$_2$ | 30 | — | | R$_2$ | 15 | — | | 82 | 63 |
| Example 9 | g · P$_2$ | 30 | P$_2$ | 15 | g · Q$_1$ | 15 | Q$_1$ | 15 | R$_2$ | 25 | — | | 91 | 82 |
| Example 10 | g · P$_2$ | 25 | P$_2$ | 20 | g · Q$_2$ | 10 | Q$_2$ | 10 | R$_2$ | 35 | — | | 97 | 75 |
| Comparative Example 1 | g · P$_1$ | 100 | — | | — | | — | | — | | — | | 50 | 33 |
| Comparative Example 2 | g · P$_1$ | 97.5 | — | | — | | — | | R$_1$ | 2.5 | — | | 54 | 41 |
| Comparative Example 3 | g · P$_1$ | 50 | — | | — | | — | | R$_1$ | 50 | — | | 87 | 62 |
| Comparative | g · P$_1$ | 25 | — | | — | | — | | R$_1$ | 75 | — | | 90 | 66 |

TABLE 1-continued

| Example 4 Comparative Example 5 | g·P₁ | 25 | P₁ | 25 | — | — | R₁ | 25 | g·R₃* | 25 | 93 | 67 |
| Comparative Example 6 | g·P₁ | 25 | — | | g·Q₁ | 25 | Q₁ | 20 | R₃ | 30 | — | 81 | 65 |

| Run No. | Heat Resistance and Fuel Oil Resistance Test (decrease %) | Adhesive Strength to PA6 (kg/cm) Before Processing/After Processing |
|---|---|---|
| Example 1 | 3 | ≧6.3(a)/≧5.0(a) |
| Example 2 | 0 | ≧7.1(a)/≧5.2(a) |
| Example 3 | 8 | ≧6.5(a)/≧4.9(a) |
| Example 4 | 0 | ≧7.5(a)/≧5.9(a) |
| Example 5 | 10 | ≧6.2(a)/4.7 |
| Example 6 | 0 | ≧7.4(a)/≧5.6(a) |
| Example 7 | 0 | ≧6.6(a)/≧5.3(a) |
| Example 8 | 5 | ≧5.9(a)/4.6 |
| Example 9 | 0 | ≧6.2(a)/≧5.4(a) |
| Example 10 | 10 | ≧6.0(a)/≧5.0(a) |
| Comparative Example 1 | 21 | 3.5/21(b) |
| Comparative Example 2 | 20 | 4.1/3.0 |
| Comparative Example 3 | 13–37(c) | ≧5.2(a)/≧1.8(c) |
| Comparative Example 4 | 26–48(c) | 4.0/0.9(c) |
| Comparative Example 5 | 19–63(d) | 4.8/1.5(d) |
| Comparative Example 6 | 44–78(d) | 4.4/1.7(d) |

(a): The sheet was cut before peeling.
(b): Partial peeling from the end surface took place.
(c): The degree of swelling due to gasoline was large, and the unevenness was great.
(d): Part of the test piece was dissolved in the fuel oil, and deformation took place.
*g·R₃ was used in place of the resins g·Q₁ and g·Q₂.

Example 11

A mixture of the HDPE ($P_1$) powder used in Example 3 and the L-LDPE ($Q_1$) used in Example 4 in a ratio of 85/15 (wt%) was prepared in advance by the use of a Henshel mixer. To 100 parts by weight of the mixture was added 0.012 part by weight of 2,5-dimethyl-2,5-tert-butylperoxyhexane, which were then dry blended for 2 minutes. After addition of 0.35 part by weight of maleic anhydride, the resulting mixture was dry blended for 2 minutes. The mixture thus obtained was melt kneaded at a resin temperature of 263° C. by the use of an extruder of 40 mm in diameter to produce maleic anhydride grafted PE in which the amount of maleic anhydride grafted as determined by the infrared absorption spectral method was 0.31 wt%.

A resin mixture of 45 wt% of the maleic anhydride grafted PE, 30 wt% of L-LDPE ($Q_1$) and 25 wt% of L-VLDPE ($R_1$) was melt kneaded at 215° C. by the use of a Dulmage screw extruder of 50 mm in diameter to prepare a polyethylenic composition (S).

With regard to this polyethylenic composition, Izod impact strengthens at 23° C. and −40° C. were 98 kg.cm/cm and 84 kg.cm/cm, respectively, and the decrease of elongation in the heat resistance and fuel oil resistance was 0%.

In connection with adhesive strength, no peeling took place before the treatment, and after the treatment, it was ≧6.5 kg.cm/cm; excellent adhesive properties and long term durability were exhibited.

Example 12 and Comparative Example 7

A two different material-three layer structure sheet produced using the (polyethylenic) composition (S) obtained in Example 11 and Nylon 6 was cut to square pieces by the use of a sheet cutter. A mixture of 5 wt% of the above pieces and 95 wt% of high density polyethylene ($P_3$) having a density of 0.945 and HLMFR of 5 was kneaded at a resin temperature of 265° C. by the use of a coaxial twin-screw extruder having a diameter of 40 mm to prepare a composition (T).

Examination of the state of dispersion of Nylon 6 in the composition (T) with an optical microscope showed that the average particle diameter was 73 μ.

The composition (T) was measured for impact resistance in the same manner as in Example 1. Izod impact strengthens at 23° C. and −40° C. were 60 kg.cm/cm and 53 kg.cm/cm, respectively, which were nearly equal to the respective values of high density polyethylene $P_3$ alone, 59 kg. cm/cm and 55 kg.cm/cm.

The graft modified HDPE (g.$P_1$) used in Comparative Example 1 was measured in the same manner as above. Izod impact strengthens at 23° C. and −40° C. were 55 kg.cm/cm and 42 kg.cm/cm, respectively, which were lower than those of $P_3$ as described above. Thus it can be seen that the composition of the present invention is quite excellent in impact resistance.

Examples 13 to 22 and Comparative Examples 8 to 14

The unmodified and modified polyethylenic resins used in Examples 13 to 22 and Comparative Examples 8 to 14 are as follows:

Polyethylenic resins the type and mixing ratio of which are shown in Table 2, were dry blended in advance for 2 minutes by the use of a Henschel mixer. Each mixture obtained was melt kneaded at a resin temperature in the range of from 200° to 210° C. by the use of an extruder (diameter 50 mm) provided with a Dulmage-screw, and a polyethylenic resin composition in the form of pellet was produced (abbreviated symbol for each composition is shown in Table 2).

In order to measure the Izod impact strength and heat resistance and fuel oil resistance of each polyethylenic resin composition obtained above, a test piece was produced. This test piece was measured for Izod impact strength at 23° C. and −35° C., and as the heat resistance and fuel oil resistance test, the tensile elongation at break ($E_1$) of the test piece subjected to the durability test and the tensile elongation at break ($E_0$) of the test piece not subjected to the durability test were measured. In addition, the initial adhesive properties to the polyamide resin (Nylon 6) and the adhesive durability were measured. The results are shown in Table 3.

(1) Modified HDPE (indicated by g.$P_4$)

To 100 parts by weight of HDPE (indicated by $P_4$) having MFR of 0.9 g/10 min. and a density of 0.953 g/cm$^3$ was added as a radical initiator 0.010 part by weight of 2,5-dimethyl-2,5-tert-butylperoxyhexane, which were then dry blended for 2 minutes by the use of a Henschel mixer. Then, 0.37 part by weight of maleic anhydride was added to the mixture obtained above and dry blended for 3 minutes by the use of a Henschel mixer. The mixture thus obtained was melt kneaded at a resin temperature of 265° C. by the use of an extruder (diameter 40 mm) and pelletized to obtain g.$P_4$ as modified HDPE.

The amount of maleic anhydride grafted was 0.33 wt% as determined by the infrared absorption spectral method.

(2) Modified HDPE (indicated by g.$P_5$)

This was modified HDPE in which the amount of maleic anhydride grafted was 0.31 wt%, as obtained in the same manner as in (1) above except that HDPE indicated by $P_5$ having MFR of 0.25 g/10 min. and a density of 0.955 g/cm$^3$ was used.

(3) Modified HDPE (indicated by g.$P_6$)

This was modified HDPE in which the amount of maleic anhydride grafted was 0.31 wt%, as obtained in the same manner as in (1) above except that HDPE (indicated by $P_6$) having MFR of 2.0 g/10 min. and a density of 0.944 g/cm$^3$ was used.

(4) modified L-VLDPE (indicated by g.$R_4$)

This was modified L-VLDPE in which the amount of maleic anhydride grafted was 0.29 wt%, as obtained in the same manner as in (1) above except that L-VLDPE (indicated by $R_4$) having MFR of 2.0 g/10 min., a density of 0.895 g/cm$^3$, a melting point as determined by the DSC method of 97° C. and a number of branches of 70/1,000 carbon atoms of the main chain was used.

(5) L-LDPE (indicated by $Q_3$)

This was a copolymer of ethylene and butene-1, having a density of 0.929 g/cm$^3$, MFR of 0.89 g/10 min., a melting point as determined by the DSC method of 120° C., and a number of branches of 29/1,000 carbon atoms of the main chain.

(6) L-LDPE (indicated by $Q_4$)

This was a copolymer of ethylene and butene-1, having a density of 0,921 g/cm$^3$, MFR of 2.0 g/10 min., a melting point as determined by the DSC method of 120° C., and a number of branches of 17/1,000 carbon atoms of the main chain.

(7) L-VLDPE (indicated by $R_5$)

This was a linear very low density polyethylenic resin having a density of 0.903 g/cm$^3$, MFR of 1.1 g/10 min., a melting point as determined by the DSC method of 120° C., and having a number of branches of 30/1,000 carbon atoms of the main chain, as obtained by polymerizing in the presence of a catalyst comprising a titanium-containing solid catalytic component and an organoaluminum compound.

(8) L-VLDPE (indicated by $R_6$)

This was a linear very low density polyethylenic resin having a density of 0.897 g/cm$^3$, MFR of 0.71 g/10 min., a melting point as determined by the DSC method of 116° C., and a number of branches of 37/1,000 carbon atoms of the main chain.

TABLE 2

Resins of Composition and Formulation (parts by weight)

| Run No. | Modified HDPE | | HDPE | | L-LDPE | | L-VLDPE | | Abbreviated Symbol of Composition |
|---|---|---|---|---|---|---|---|---|---|
| Example 13 | g · $P_4$ | 40 | — | 0 | $Q_3$ | 50 | $R_5$ | 10 | Composition (A) |
| Example 14 | g · $P_4$ | 45 | — | 0 | $Q_3$ | 40 | $R_5$ | 15 | Composition (B) |
| Example 15 | g · $P_4$ | 40 | — | 0 | $Q_3$ | 35 | $R_5$ | 25 | Composition (C) |
| Example 16 | g · $P_4$ | 50 | — | 0 | $Q_3$ | 15 | $R_5$ | 35 | Composition (D) |
| Example 17 | g · $P_4$ | 25 | $P_4$ | 25 | $Q_3$ | 30 | $R_5$ | 20 | Composition (E) |
| Example 18 | g · $P_4$ | 10 | $P_4$ | 60 | $Q_3$ | 10 | $R_5$ | 20 | Composition (F) |
| Example 19 | g · $P_4$ | 70 | $P_4$ | 5 | $Q_3$ | 5 | $R_5$ | 20 | Composition (G) |
| Example 20 | g · $P_5$ | 20 | $P_5$ | 15 | $Q_4$ | 40 | $R_6$ | 25 | Composition (H) |
| Example 21 | g · $P_6$ | 20 | $P_5$ | 10 | $Q_3$ | 50 | $R_5$ | 20 | Composition (J) |
| Example 22 | g · $P_6$ | 25 | $P_5$ | 25 | $Q_3$ | 20 | $R_5$ | 30 | Composition (K) |
| Comparative Example 8 | g · $P_4$ | 100 | — | 0 | — | 0 | — | 0 | — |
| Comparative Example 9 | g · $P_4$ | 50 | $P_4$ | 50 | — | 0 | — | 0 | Composition (L) |
| Comparative Example 10 | g · $P_4$ | 50 | $P_4$ | 25 | $Q_3$ | 25 | — | 0 | Composition (M) |
| Comparative Example 11 | g · $P_4$ | 25 | $P_4$ | 25 | — | 0 | $R_5$ | 50 | Composition (N) |
| Comparative Example 12 | g · $P_4$ | 10 | — | 0 | $Q_3$ | 20 | $R_5$ | 70 | Composition (P) |
| Comparative Example 13 | g · $P_4$ | 25 | $P_4$ | 25 | $Q_3$ | 25 | $R_4$ | 25 | Composition (Q) |
| Comparative Example 14 | g · $R_4$ | 15 | $P_4$ | 25 | $Q_3$ | 25 | $R_5$ | 25 | Composition (R) |

TABLE 3

| Run No. | Izod Impact Strength (kg · cm/cm) 23° C. | Izod Impact Strength (kg · cm/cm) −35° C. | Heat Resistance and Fuel Oil Resistance Test Rate of Decrease (%) |
|---|---|---|---|
| Example 13 | 72 | 60 | 11 |
| Example 14 | 83 | 67 | 0 |
| Example 15 | 90 | 73 | 0 |
| Example 16 | 91 | 70 | 5 |
| Example 17 | 85 | 65 | 0 |
| Example 18 | 64 | 61 | 7 |
| Example 19 | 62 | 59 | 16 |
| Example 20 | 81 | 68 | 0 |
| Example 21 | 79 | 64 | 0 |
| Example 22 | 86 | 66 | 0 |
| Comparative Example 8 | 48 | 33 | 23 |
| Comparative Example 9 | 51 | 34 | 19 |
| Comparative Example 10 | 54 | 42 | 8 |
| Comparative Example 11 | 88 | 60 | 0–34* |
| Comparative Example 12 | 92 | 67 | 8–45* |
| Comparative Example 13 | 64 | 41 | 25–60** |
| Comparative Example 14 | 79 | 43 | 40–75** |

*The degree of swelling at the side of gasoline was large, the unevenness was great.
**Part of the test piece was dissolved in gasoline, and deformation took place.

In order to evaluate the polyethylenic resin composition of the present invention as obtained above, adhesive properties to the polyamide resin were tested. The results are shown in Table 4.

TABLE 4

| Composition, etc. | Adhesion Test (kg/cm) Before Treatment | Adhesion Test (kg/cm) After Treatment |
|---|---|---|
| Composition (A) | ≧6.2[a] | 4.9 |
| Composition (B) | ≧6.0[a] | 4.7 |
| Composition (C) | ≧6.9[a] | ≧5.5[a] |
| Composition (D) | ≧6.3[a] | ≧5.0 |
| Composition (E) | ≧6.7[a] | ≧5.6[a] |
| Composition (F) | ≧5.9[a] | 4.0 |
| Composition (G) | ≧6.4[a] | ≧5.5[a] |
| Composition (H) | ≧6.0[a] | 4.6 |
| Composition (J) | ≧6.1[a] | 4.5 |
| Composition (K) | ≧6.0[a] | ≧5.1[a] |
| g · P$_4$ | 3.3 | 2.4[d] |
| Composition (L) | 3.9 | 2.9 |
| Composition (M) | 4.6 | 3.4 |
| Composition (N) | ≧5.1[a] | 2.0[b] |
| Composition (P) | 4.2 | 1.1[b] |
| Composition (Q) | 5.0 | 1.6[c] |
| Composition (R) | 3.5 | 1.9[c] |

[a]The sheet was cut.
[b]The degree of swelling of gasoline was large, and unevenness was great.
[c]Part of the test piece was dissolved in gasoline, and deformation took place.
[d]Partial peeling from the end surface took place.

Examples 23 to 33 and Comparative Examples 15 to 20

Modified L-LDPEs used in these examples and comparative examples were the ones produced as described below. Characteristics of the unmodified HDPE and L-VLDPE used in the resin composition are also shown below.

Compositions using these various polyethylenes were prepared in the form of pellet by melt kneading mixtures previously dry blended in the ratios shown in Table 5, at a temperature of 215° C. by the use of a 40 mm diameter extruder provided with a Dulmage type screw.

(a) Modified L-LDPE (indicated by g.Q$_5$)

To L-LDPE (Q$_5$) having a density of 0.925 g/cm$^3$, MFR of 0.70 g/10 min., a number of short chain branches of 11/1,000 carbon atoms of the main chain, and Tmp of 121° C. was added 0.01 phr of 2,5-dimethyl-2,5-tert-butylperoxyhexane, which were then dry blended for 2 minutes by the use of a Henschel mixer. Then, 0.350 phr of maleic anhydride was added, and the resulting mixture was dry blended for 2 minutes. The mixture thus obtained was melt kneaded at a resin temperature of 255° C. and pelletized.

The amount of maleic anhydride grafted was 0.29 wt%.

(b) Modified L-LDPE (indicated by g.Q$_6$)

Modified L-LDPE (g.Q$_6$) was produced by modifying in the same manner as in (a) above except that L-LDPE (Q$_6$) powder having a density of 0.920 g/cm$^3$, MFR of 1.9 g/10 min., a number of short chain branches of 15/1,000 carbon atoms of the main chain, and Tmp of 120° C. was used. The amount of maleic anhydride grafted was 0.28 wt%.

(c) Modified L-LDPE (indicated by g.Q$_7$)

Modified L-LDPE (g.Q$_7$) was produced by modifying in the same manner as in (a) above except that L-LDPE (Q$_7$) powder having a density of 0.916 g/cm$^3$, MFR of 3.0 g/10 min., a number of short chain branches of 21/1,000 carbon atoms of the main chain, and Tmp of 119° C. was used. The amount of maleic anhydride grafted was 0.28 wt%.

(d) HDPE (indicated by P$_7$)

HDPE having a density of 0.935 g/cm$^3$ and MFR of 0.70 g/10 min., was used.

(e) HDPE (indicated by P$_8$)

HDPE having a density of 0.946 g/cm$^3$ and MFR of 1.1 g/10 min., was used.

(f) L-VLDPE (indicated by R$_7$)

This was L-VLDPE having a density of 0.903 g/cm$^3$, MFR of 0.95 g/10 min., Tmp of 120° C. and a number of short chain branches of 26/1,000 carbon atoms of the main chain.

(g) L-VLDPE (indicated by R$_8$)

This was L-VLDPE having a density of 0.898 g/cm$^3$, MFR of 3.0 g/10 min., Tmp of 116° C. and a number of short chain branches of 38/1,000 carbon atoms of the main chain.

(h) L-VLDPE (indicated by R$_9$)

This was L-VLDPE having a density of 0.900 g/cm$^3$, MFR of 2.0 g/10 min., Tmp of 100.5° C. and a number of short chain branches of 75/1,000 carbon atoms of the main chain, which was different from the above ones and obtained in the presence of the conventional vanadium catalyst system.

(i) Modified L-VLDPE (indicated by g.R$_9$)

This was produced by modifying in the same manner as in (a) above except that as the polyethylene, R$_9$ is used. The amount of maleic anhydride grafted was 0.27 wt%.

(j) L-LDPE (Q$_5$.Q$_6$.Q$_7$)

These were L-LDPEs used in production of modified L-LDPEs (g.Q$_5$, g.Q$_6$, g.Q$_7$), respectively.

TABLE 5

| Run No. | Resins of Composition and Formulation (% by weight) | | | | | | | Izod Impact Strength (kg · cm/cm) | |
|---|---|---|---|---|---|---|---|---|---|
| | HDPE | | Modified L-LDPE | | L-LDPE | | L-VLDPE | 23° C. | −35° C. |
| Example 23 | P$_7$ | 10 | g · Q$_5$ | 72.5 | Q$_5$ | 10 | R$_7$ | 7.5 | 76 | 70 |
| Example 24 | P$_7$ | 20 | g · Q$_5$ | 45 | Q$_5$ | 20 | R$_7$ | 15 | 74 | 72 |
| Example 25 | P$_7$ | 10 | g · Q$_5$ | 15 | Q$_5$ | 60 | R$_7$ | 15 | 80 | 75 |
| Example 26 | P$_7$ | 30 | g · Q$_5$ | 25 | Q$_5$ | 20 | R$_7$ | 25 | 85 | 79 |
| Example 27 | P$_7$ | 30 | g · Q$_5$ | 5 | Q$_5$ | 40 | R$_7$ | 25 | 82 | 75 |
| Example 28 | P$_7$ | 50 | g · Q$_5$ | 10 | Q$_5$ | 5 | R$_7$ | 35 | 73 | 69 |
| Example 29 | P$_7$ | 20 | g · Q$_6$ | 50 | — | — | R$_7$ | 30 | 76 | 73 |
| Example 30 | P$_8$ | 45 | g · Q$_6$ | 25 | Q$_6$ | 5 | R$_7$ | 25 | 80 | 71 |
| Example 31 | P$_8$ | 50 | g · Q$_5$ | 25 | Q$_5$ | 10 | R$_8$ | 15 | 75 | 68 |
| Example 32 | P$_7$ | 40 | g · Q$_7$ | 15 | Q$_7$ | 20 | R$_8$ | 25 | 77 | 70 |
| Example 33 | P$_7$ | 47.5 | g · Q$_7$ | 10 | Q$_6$ | 10 | R$_8$ | 32.5 | 75 | 70 |
| Comparative Example 15 | — | — | g · Q$_5$ | 100 | — | — | — | — | 56 | 40 |
| Comparative Example 16 | — | — | g · Q$_5$ | 50 | Q$_5$ | 30 | R$_7$ | 20 | 63 | 54 |
| Comparative Example 17 | P$_7$ | 20 | g · Q$_5$ | 25 | Q$_5$ | 5 | R$_7$ | 50 | 79 | 65 |
| Comparative Example 18 | P$_7$ | 10 | g · Q$_5$ | 15 | — | — | R$_8$ | 75 | 81 | 62 |
| Comparative Example 19 | P$_7$ | 30 | g · Q$_5$ | 5 | Q$_5$ | 40 | R$_9$ | 25 | 80 | 69 |
| Comparative Example 20 | P$_7$ | 15 | — | — | Q$_5$ | 60 | R$_9$ g · R$_9$ | 10 15 | 79 | 64 |

| Run No. | Heat Resistance and Fuel Oil Resistance Test (decrease %) | Adhesive Strength to PA6 (kg/cm) Before Treatment/After Treatment |
|---|---|---|
| Example 23 | 5 | ≧5.7/≧4.9 |
| Example 24 | 3 | ≧6.0/≧5.1 |
| Example 25 | 10 | ≧5.5/≧4.8 |
| Example 26 | 0 | ≧6.1/≧4.8 |
| Example 27 | 0 | ≧5.8/≧5.0 |
| Example 28 | 7 | ≧5.3/4.6 |
| Example 29 | 10 | ≧6.2/4.7 |
| Example 30 | 0 | ≧5.6/≧5.1 |
| Example 31 | 5 | ≧5.4/≧4.8 |
| Example 32 | 3 | ≧5.9/≧5.0 |
| Example 33 | 5 | ≧5.6/4.7 |
| Comparative Example 15 | 15 | 4.0/2.5 |
| Comparative Example 16 | 24 | 4.3/3.1 |
| Comparative Example 17 | 18–35 | 4.1/1.0 |
| Comparative Example 18 | 32–80 | 3.8/0.3 |
| Comparative Example 19 | 20–45 | 4.5/1.4 |
| Comparative Example 20 | 48–73 | 3.6/1.2 |

Example 34 and Comparative Example 21

A two different material-three layer structure sheet produced by using the resin composition obtained in Example 26 and Nylon 6 (the inner layer was made of Nylon 6) was cut to square pellets by the use of a sheet cutter. A mixture of 5 wt% of the above pellets and 95 wt% of high density polyethylene (P$_9$) having a density of 0.945 and HLMFR of 5 was kneaded at a resin temperature of 260° C. by the use of a 40 mm coaxial twin-screw extruder to produce a composition.

Nylon 6 particles in the composition were dyed with a red acidic dye, and the state of dispersion of the Nylon 6 particles in the composition was examined under an optical microscope. The maximum particle diameter was 85 μ, and the average particle diameter was 50 μ.

The impact resistance (Izod impact strength) of the composition was 58 kg.cm/cm and 55 kg.cm/cm at 23° C. and −35° C., respectively, which were nearly equal to the values, 60 kg.cm/cm and 57 kg.cm/cm, of the high density polyethylene (P$_9$) alone.

Using the adhesive resin composition used in Comparative Example 17, a composition was prepared by the same method as that of Example 34, which was then evaluated in the same manner as in Example 34. Izod impact strengthens at 23° C. and −35° C. were 53 kg.mm and 45 kg.mm, respectively. They were inferior to those of P$_9$, and the rate of decrease in the heat resistance and fuel oil resistance test was as large as 18% (0% in the case of P$_9$ alone).

As described above, the polyethylenic resin composition of the present invention has the following effects.

(1) Needless to say, impact resistance at ambient temperature is excellent, and moreover, impact resistance at low temperature (for example, −40° C.) is good.

(2) Heat resistance and fuel oil resistance are excellent.

(3) Affinity and adhesive properties to various resinous materials such as a polyethylene resin, a polyamide resin, EVOH and a thermoplastic polyester resin, and various metals are good. A laminate in which the composition of the present invention is sandwiched particularly between a polyethylene resin and a polyamide resin, can be produced. This laminate is excellent in heat resistance and fuel oil resistance.

Industrial Applicability

Since the polyethylenic resin composition of the present invention has the aforementioned effects, it can be utilized in a number of fields. Typical applications in which it is bonded to the aforementioned various resinous and metallic materials, or it is sandwiched therebetween, are shown below.

(1) Various containers containing fuel oil, such as a gasoline tank, and other parts (2) Various wrapping materials (3) Various industrial materials

We claim:

1. A polyethylenic resin composition consisting of:
   (1) at least one high density polyethylenic resin selected from the group consisting of:
      (a) a high density polyethylenic resin having a density (g/cm$^3$) of at least 0.935 and a melt flow rate (g/10 min.) of at least 0.01 (Resin A), and
      (b) a modified high density polyethylenic resin derived by grafting on the Resin A at least one monomer selected from the group consisting of an unsaturated carboxylic acid and its derivative (Resin B);
   (2) a linear low density polyethylenic resin consisting of a mixture of Resin C and D or Resin D alone, wherein Resin C is:
      (c) a linear low density polyethylenic resin having a number of short chain branches of 5 to 30/1,000 carbon atoms of the main chain, a density (g/cm$^3$) of at least 0.910, but less than 0.935, a melt flow rate (g/10 min.) of 0.1 to 50, and a melting point as determined by the differential scanning calorimetric method of 115 to 130° C., and Resin D is:
      (d) a modified linear low density polyethylenic resin derived by grafting on the Resin C, the monomer as defined in (b) above; and
   (3)(e) a linear very low density polyethylenic resin having a number of short chain branches of 18 to 60/1,000 carbon atoms of the main chain, a density (g/cm$^3$) of at least 0.890 but less than 0.910, a melt flow rate (g/10 min.) of 0.1 to 30, and a melting point as determined by the differential scanning calorimetric method of 110 to 125 (Resin E), wherein the weight ratio of (Resin D)/(Resin C+Resin D) is at least 1/1,000. the weight ratio of (Resin A+Resin B)/(Resin A+Resin B+Resin C+Resin D) is 1/10 to 975/1,000, the proportion of the Resin E in the total composition is 5 to 40% by weight, and the proportion of the total amount of grafted monomers in the total composition is 0.001 to 5.0% by weight.

2. The polyethylenic resin composition consisting essentially of:
   (1) at least one high density polyethylenic resin selected from the group consisting of:
      (a) a high density polyethylenic resin having a density (g/cm$^3$) of at least 0.935 and a melt flow rate (g/10 min.) of at least 0.01 (Resin A), and
      (b) a modified high density polyethylenic resin derived by grafting on the Resin A at least one monomer selected from the group consisting of an unsaturated carboxylic acid and its derivative (Resin B);
   (2) a linear low density polyethylenic resin consisting of a mixture of Resin C and D or Resin D alone, wherein Resin C is:
      (c) a linear low density polyethylenic resin having a number of short chain branches of 5 to 30/1,000 carbon atoms of the main chain, a density (g/cm$^3$) of at least 0.910, but less than 0.935, a melt flow rate (g/10 min.) of 0.1 to 50, and a melting point as determined by the differential scanning calorimetric method of 115° to 130° C., and Resin D is:
      (d) a modified linear low density polyethylenic resin derived by grafting on the Resin C, the monomer as defined in (b) above; and
   (3)(e) a linear very low density polyethylenic resin having a number of short chain branches of 18 to 60/1,000 carbon atoms of the main chain, a density (g/cm$^3$) of at least 0.890, but less than 0.910, a melt flow rate (g/10 min.) of 0.1 to 30, and a melting point as determined by the differential scanning calorimetric method of 110 to 125 (Resin E), wherein the weight ratio of (Resin D)/(Resin C+Resin D) is at least 1/1,000. the weight ratio of (Resin A+Resin B)/(Resin A+Resin B+Resin C+Resin D) is 1/10 to 975/1,000. the proportion of the Resin E in the total composition is 5 to 40% by weight, and the proportion of the total amount of grafted monomers in the total composition is 0.001 to 5.0% by weight.

* * * * *